United States Patent [19]

Hatagami et al.

[11] Patent Number: 4,978,902
[45] Date of Patent: Dec. 18, 1990

[54] SYNCHRONOUS ROTATION CONTROL SYSTEM OF MAGNETICALLY RECORDING DISK

[75] Inventors: Toshifumi Hatagami, Machida; Masahito Iwatsubo; Tooru Shinohara, both of Kawasaki, all of Japan

[73] Assignee: Fujitsu Limited, Kawasaki, Japan

[21] Appl. No.: 150,220

[22] Filed: Jan. 29, 1988

[30] Foreign Application Priority Data

Jan. 29, 1987 [JP] Japan .................................. 62-019389

[51] Int. Cl.$^5$ ................................................ G05B 1/02
[52] U.S. Cl. ..................................... 318/608; 318/603; 360/72.2; 360/70; 360/73.01
[58] Field of Search ............... 318/600, 601, 603, 604, 318/606–608, 569; 360/70–71, 72.1, 72.2, 78.04, 78.06, 73.01–73.02; 369/240

[56] References Cited

U.S. PATENT DOCUMENTS

| | | | |
|---|---|---|---|
| 4,125,882 | 10/1978 | Erickson et al. | 360/78.04 |
| 4,268,679 | 6/1980 | Hertrich | 368/78.08 |
| 4,528,603 | 7/1985 | Abe | 360/70 |
| 4,644,426 | 2/1987 | Saito | 360/71 |
| 4,658,307 | 4/1987 | Tsuyuguchi et al. | 360/71 |
| 4,706,005 | 11/1987 | Iwako | 318/603 |

Primary Examiner—William M. Shoop, Jr.
Assistant Examiner—David Martin
Attorney, Agent, or Firm—Staas & Halsey

[57] ABSTRACT

A delay circuit which compensates for a variable phase output of an index signal by delaying the read out index signal. The delay time of the delay circuit depends on the cylinder on which a read/write head is located, and is chosen so that the delayed index signals are generated at an essentially constant phase angle with respect to a reference angular position. The delay circuit may include a counter which is pre-loaded with an address of the cylinder on which the head is located, and which counts number of clock pulses input to the counter. Overflowing of the counter generates the compensated index signal. Thus, synchronous operation of plural disk apparatus is accomplished, when the head seeks a new cylinder.

21 Claims, 7 Drawing Sheets

SYNCHRONOUS ROTATION CONTROL SYSTEM OF MAGNETICALLY RECORDING DISK

BACKGROUND OF THE INVENTION

1. Field of the Invention

This invention relates to a disk apparatus for magnetically recording information on a disk, and more particularly, to the servo control of synchronous rotation of recording disks utilizing a rotational arm for actuating read/write heads, and, further, to a system in which index marks for indicating disk rotation are magnetically written on each cylinder deviated from a radial line of the disk so that the index marks on neighboring cylinders are aligned with each other.

2. Description of the Related Art

Figure 1:
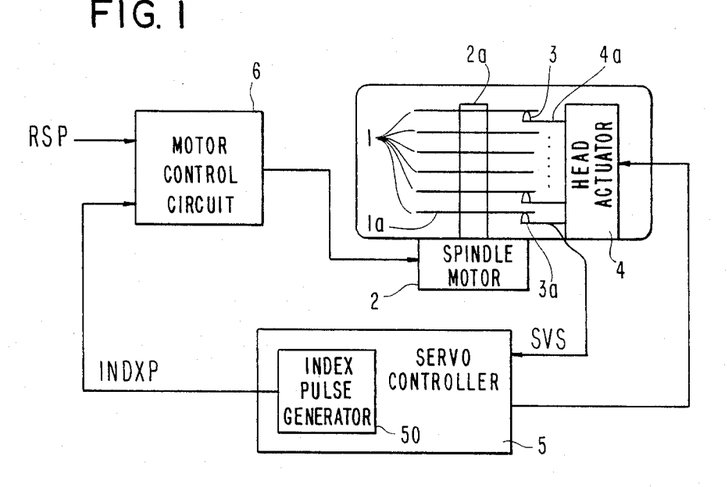
FIG. 1 schematically illustrates a prior art configuration of a synchronous rotation control of a magnetically recorded disk system.
Figure 2A:
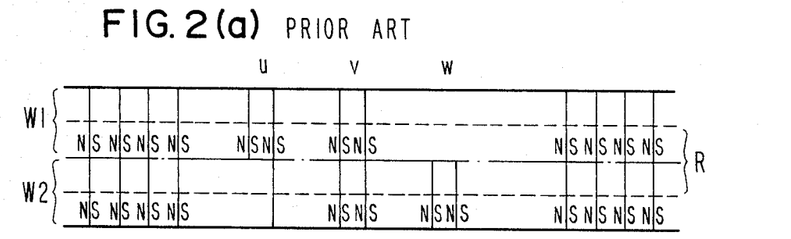
FIG. 2(a) schematically illustrates a magnetized pattern forming a single byte.
Figure 2B:
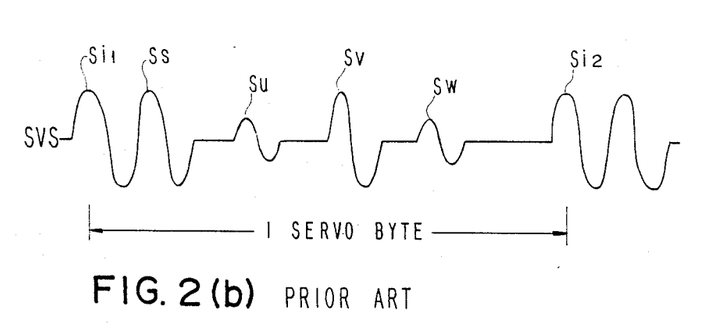
FIG. 2(b) shows a signal waveform, read by a servo head, of the single byte of FIG. 2(a)
Figures 3A, 3B:
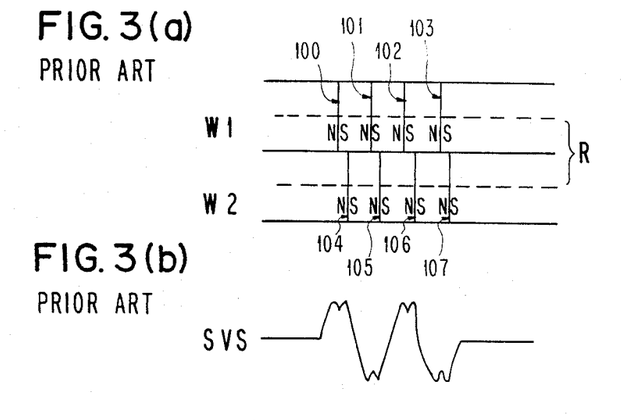
FIG. 3(a) schematically illustrates a magnetized pattern of index marks on two adjacent cylinders in which the index marks are not aligned with each other.
FIG. 3(b) shows signal waveform, read by a servo head, of the index marks of FIG. 3(a)

As shown in FIG. 1, in a magnetically recorded disk system, a plurality of recording disks 1 rotate simultaneously on a single spindle 2a. Magnetic heads 3 for reading/writing data on the disks are moved simultaneously by a head actuator 4 to select and maintain the heads on a cylinder. The head actuator 4 is driven by a servo controller 5. To seek a particular cylinder, as well as to detect rotation of the disks, a servo control surface 1a is provided as one of the surfaces of the disks 1, and a head 3a, for reading information from the servo control surface 1a, is also provided. The servo control head 3a reads out servo control information SVS, including index marks and guard band patterns, magnetically written on each track on the servo control surface 1a. The index marks are written with a servo control track writer (not shown in FIG. 1) between a first and last sector of each cylinder. The index marks are extracted from the servo control information SVS by an index pulse generator 50 and a signal is generated indicating the occurrence of a single rotation of the disks. The signal is fed back via a motor control circuit 6 to spindle motor 2, which rotates the disks to control the rotation of the disks. The index mark typically consists of sequential bit positions. Each bit of the servo control information SVS has a magnetized pattern. A group of these bits make up a servo control byte, a typical example of which is shown in FIG. 2(a), where W1 and W2 denote adjacent cylinders, and N (North) and S (South) denote the magnetic polarity. $Si_1$ and $Si_2$ are index bits, and Ss is a sync or reference bit. The bits from $Si_1$ to $Si_2$ make up a single servo control byte. The sync bit Ss is written in each servo control byte, and control generates a clock signal when read by servo control head 3a. The index bits $Si_1$ and $Si_2$ are used to code and define an index mark or a guard band. The servo control head 3a travels along the border line between two adjacent cylinders, overlapping each cylinder. The area R covered by servo control head 3a on adjacent cylinders W1 and W2 of FIG. 2a is indicated by dashed lines. Other heads 3 for reading/writing stored data travel along a single track corresponding to W1 or W2. A waveform detected by the servo control head 3a is shown in FIG. 2(b). As is well known, the detected signals "Su", produced from the bit position "u" of the cylinder W1 and "Sw" produced from the bit position "w" of the cylinder W2, indicate the location of the servo control head 3a with respect to the adjacent cylinders W1 and W2. Concurrently, a bit position mark written on both adjacent cylinders, such as the bit position mark "v", produces a signal Sv" having a large amplitude. The index marks indicating rotation of the disk produce these pulses. Therefore, if the magnetic pattern of the written bits (lines 100–107 in FIG. 3(a)) on adjacent cylinders are not aligned with each other as shown in FIG. 3(a), peaks of the signals detected therefrom are distorted as shown in FIG. 3(b). These distorted peaks lower the accuracy of disk rotation detection and tracking accuracy.

Recently, an apparatus for magnetic recording has been developed for use in a computer system in which several disk apparatus are connected in parallel. Rotation of the disks in each disk apparatus must be synchronized with each other, i.e., locked with an external synchronization pulse, as described in an unexamined Japanese Pat. No. Sho 59-218671 by T. Negoro. In this system, the index mark must generate an accurate timing signal indicative of the disk rotation.

However, in a compact disk system, a rotational arm is generally used for moving the heads across a cylinder. In this case, the magnetized pattern of the written bits 100–107, which are parallel to the core gap of the head, are not always perpendicular to the movement of the cylinder. Therefore, the read/write head on a rotational actuator is generally provided with an azimuth (which is an angle between the core gap of the head and the disk's radial line on which the head is located) as well as an offset angle (which is an angle of deviation of the core gap of the head from the tangential line of the rotational movement of the head). The size of the azimuth and the offset angle are chosen so that the azimuth is zero on the most inner cylinder where the read signal level is the smallest. Then, the waveforms are distorted as described above. Accordingly, the azimuth varies depending on the cylinder on which the head is located. The disk is provided with a mechanical index, such as a single optical mark, which is detected by an optical detector. If the index marks are written at a constant phase difference with respect to a reference position, (the mechanical index denoted by MIX of FIG. 4), the magnetized marks on each cylinder are not aligned with the marks on adjacent cylinders, as shown by IS1 through ISn in FIG. 4. (FIG. 3(a) also shows index marks which are not aligned with each other). Therefore, the locations of the index marks are shifted on each cylinder so that the magnetized marks of adjacent cylinders are partially aligned with each other as shown by IS2′ through ISn′ in FIG. 4, and as disclosed by M. Sasaki in an unexamined Japanese Pat. No. Sho 59-48872. By this method, though there is no discontinuity of the magnetized marks, and thus, the detected signal is not distorted, the index pulses $I_2$ through $I_n$ detected from the written index marks IS2′ through ISn′ are delayed with respect to the timing of the mechanical index pulse MIX as shown in FIG. 5. In FIG. 5, the pulses written with dashed lines represent the timing of the undelayed index signals. For the synchronous control of the plural disk apparatus, the servo control is carried out so a phase difference between an external rotational synchronous pulse RSP and each of the index pulses $I_1$ through $I_n$ becomes zero. Therefore, the above-described delay of the index pulses causes a large phase change in the servo control circuit when the heads jump across cylinders to seek a new cylinder. As an example, the amount of the phase difference on the cylinders for a disk of 10.5 inches in diameter, having 1024 cylinders thereon, can be great. The phase difference between the index marks on adjacent cylinders is approximately 40 nanoseconds (ns). Therefore, when the head moves from the most inner (or outer) cylinder to the most outer (or inner) cylinder during a search, it takes approximately 40 microseconds (μs). This time, even though reduced when searching from a point between the inner and outer cylinders, is approximately 0.24% of a rotating cycle time of 3600 rpm. This is more than enough to cause an error when attempting to search a cylinder within a specified period, such as a single sector period. This is because the response characteristics of the servo loop of the motor control system may overshoot the cylinder being searched. This can cause the synchronizing servo to be disturbed to the extent that the servo loses control of the heads. Additionally, the synchronous parallel reading of the plural disk apparatus requires the above-mentioned delay time.

SUMMARY OF THE INVENTION

It is an object of the present invention to provide a synchronous rotation control system for magnetically recorded disk systems in which the synchronous rotation control can be accurately and quickly carried out without requiring a phase change of disk rotation when the read/write heads on a rotational arm move across cylinders to see a particular cylinder.

Another object of the invention is to achieve quick access to stored data in a system having a plurality of synchronized disk apparatus connected in parallel.

According to the present invention, an index mark for detecting a single rotation of the disk is written magnetically on a particular position of each cylinder so that the magnetized marks on adjacent cylinders are aligned with each other. Accordingly, each of the index marks is located offset from a reference position on the disk, the amount of offset depending on the cylinder on which the head is located. The present invention also includes a delay circuit which delays a signal generated by reading the index mark, the amount of delay being determined by the cylinder on which the head is located, so that the delayed index marks are generated at a constant phase with respect to the reference position. The delay circuit may include a digital counter which counts a predetermined number of clock pulses. The number to be counted is determined according to the cylinder on which the head is located. When the cylinder address number is used for setting the number to be counted by the counter, the address of the cylinders are chosen to be simply increasing or decreasing for the cylinders from the most inner end to the most outer end of the disk. The above-mentioned features and advantages of the present invention, together with other objects and advantages, which will become apparent, will be more fully described hereinafter, reference being had to the accompanying drawings forming a part hereof, wherein like numerals refer to like parts throughout.

DESCRIPTION OF THE PREFERRED EMBODIMENTS

The general principle of the present invention is explained below with reference to FIGS. 6 and 7. The magnetic recording disks 1, 1a and the heads 3, 3a are the same as those of the prior art shown in FIG. 1. The read/write heads 3 or 3a are situated on one end of pivotable arm 4a pivoting upon an axis (not shown) parallel to the spindle 2a of the disks. Pivot arm 4a is driven by a head actuator 4. The index marks are magnetically recorded, in advance, on each cylinder of the servo disk surface 1a so that the index marks on adjacent cylinders are aligned with each other, as explained in the prior art and shown by Is2' through Isn' in FIG. 4. An index pulse generator 50 in servo controller 5' receives a processed servo control information signal SVS detected by the servo control head 3a from the index mark, and outputs an index pulse INDXP. The servo controller 5' also controls the head actuator 4 according to a command from a higher level processing device (not shown) to read a particular cylinder using a well known technique. A delay circuit 7 outputs a delayed index pulse DIDXP by delaying the index pulse INDXP received from the index pulse generator 50 by an amount determined by the cylinder on which the head is located. This predetermined amount is selected so that the variable delay of each index pulse is compensated by generating the delayed index pulses DIDXP essentially in a same phase relation, i.e., at a same timing with respect to the above-mentioned mechanical index (reference position), regardless of the cylinder on which the head is located. Referring to FIG. 7, the index pulse INDXP1, detected from the index mark IS1 of the cylinder W1 and having no delay in relation to the mechanical index MIX, is delayed by the period $t_1$ to become a delayed index pulse DIDXP1. The delaying period $t_2$ for the second index pulse INDXP2 of the second cylinder W2 is shorter than $t_1$ and each subsequent index pulse is delayed by a progressively shorter period, so that the last index pulse INDXPn of the last cylinder Wn is delayed by $t_n$, which has the shortest delay of all the delay periods. Thus, all of the delayed index pulses DIDXP1 through DIDXPn are generated at the essentially same time with reference to the mechanical index MIX, which is equal to the time $t_1$ after the mechanical index MIX. This predetermined delay may be chosen such that the delay time $t_1$ through $t_n$ has a linear relation to the cylinder address number. Motor controller 6 detects a phase difference between the delayed index pulse DIDXP and a rotation synchronization pulse RSP from an external controller (not shown), and drives a spindle motor 2 which rotates the spindle 2a and disks 1 mounted to make the phase difference zero, i.e., to achieve synchronous servo control of the spindle motor. Accordingly, each of the delayed index pulses DIDXP1 through DIDXPn, which are all output at an essentially constant time after the mechanical index MIX, are servo controlled to be synchronous with the rotating synchronization pulse RSP as seen in FIG. 7.

Figure 6:
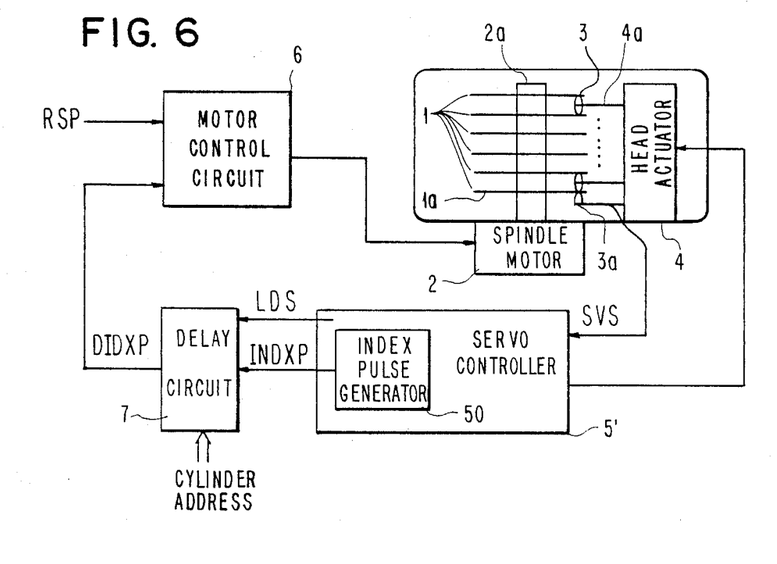
FIG. 6 is a block diagram of the present invention.
Figure 7:
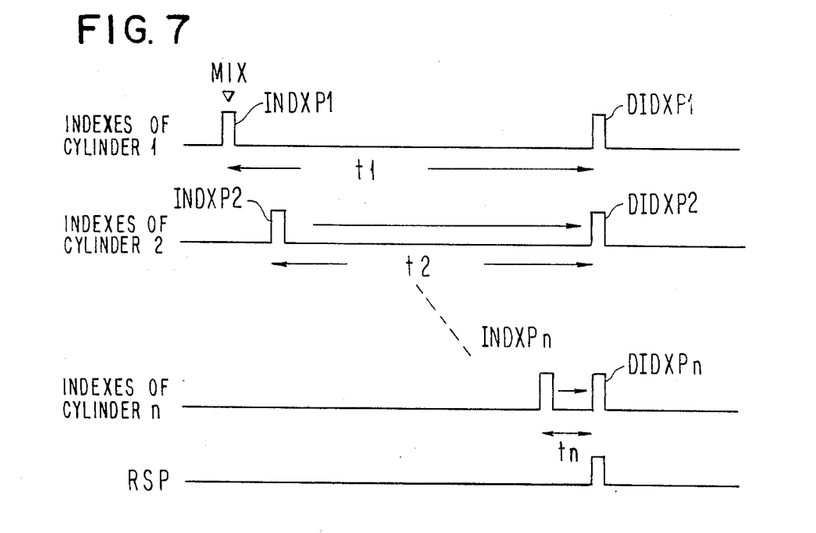
FIG. 7 shows delayed index pulses according to the present invention.
Figure 8:
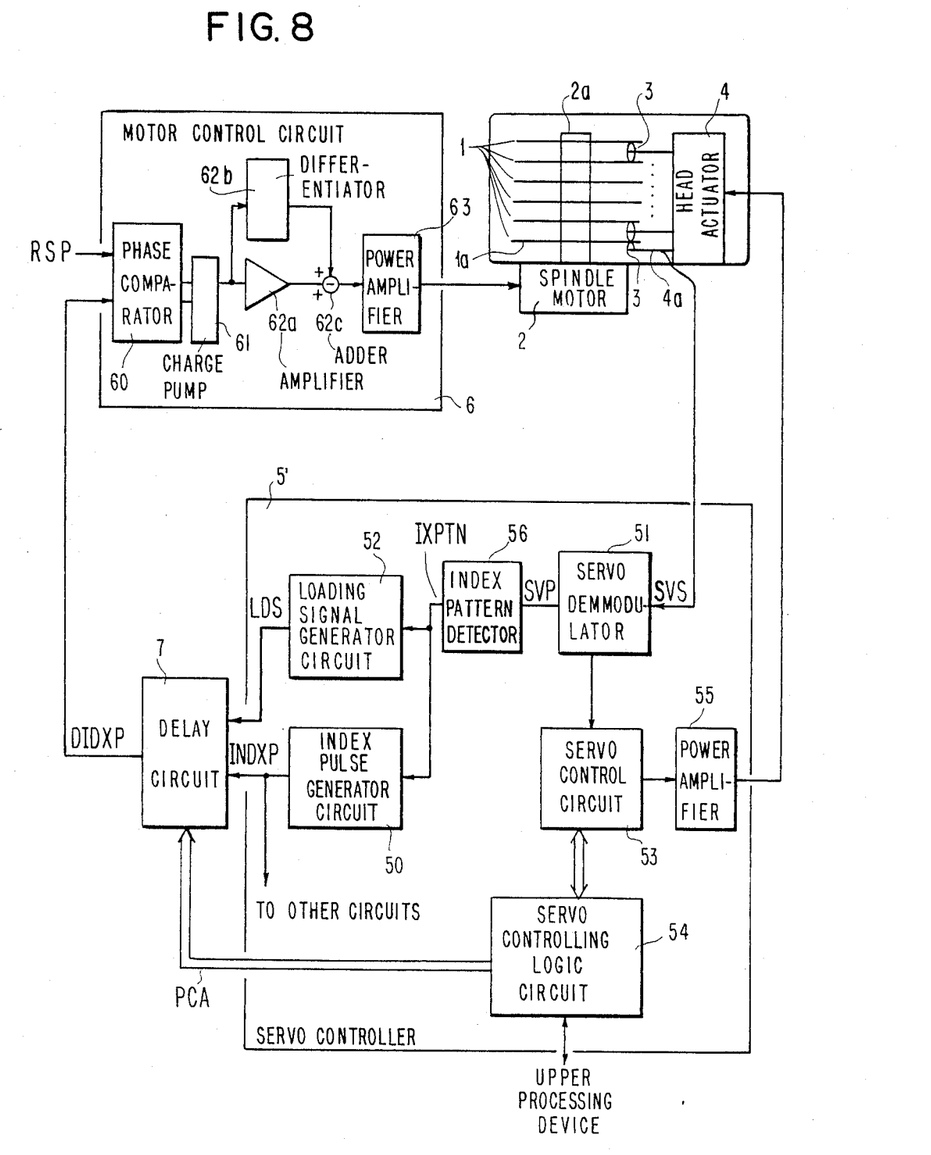
FIG. 8 is a more detailed block diagram of the system shown in FIG. 6.

A more detailed block diagram of the system of FIG. 6 is shown in FIG. 8. The servo information SVS from the servo head 3a having, for example, the waveform of FIG. 2(b), is demodulated by a servo demodulator 51 and is output for the tracking servo as well as for the rotation servo. The tracking servo of the cylinder is the same as those described earlier for the prior art, and is accomplished as described hereinafter. A servo controlling logic circuit 54 transmits to a servo control circuit 53 an address number of a cylinder for the head to move across according to an instruction received from a higher level processing device (a controller), and detects the head location (cylinder address) using the track crossing information from the servo control circuit 53. The servo control circuit 53 receives an instruction to seek a particular cylinder from servo controlling logic circuit 54, as well as servo information from the servo demodulator 51, and transmits a signal to a power amplifier 55 to drive the head actuator 4 across the disk and "lock on" to the specified cylinder.

Figure 4:
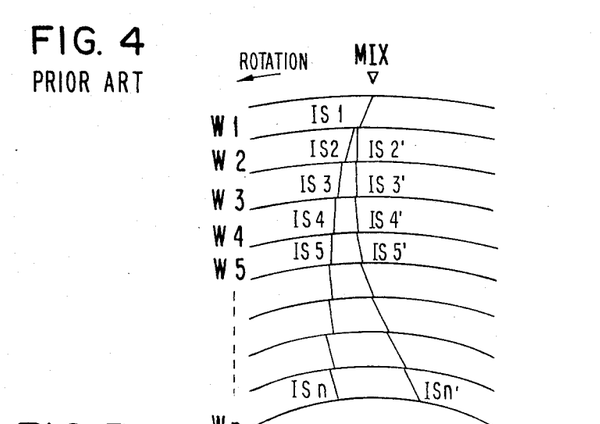
FIG. 4 shows prior art index marks and adjustment thereof.
Figure 5:
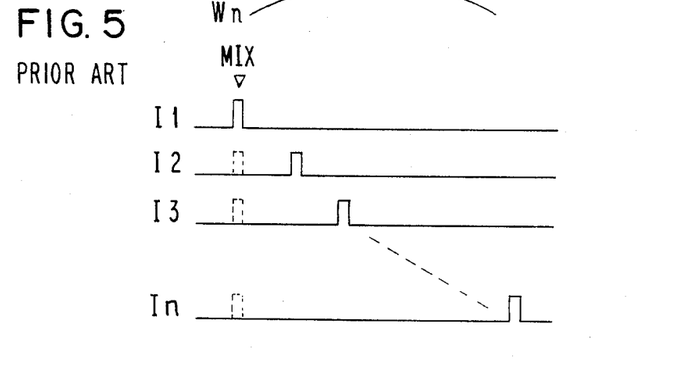
FIG. 5 shows prior art index pulses detected from the index marks of FIG. 4.
Figure 10:
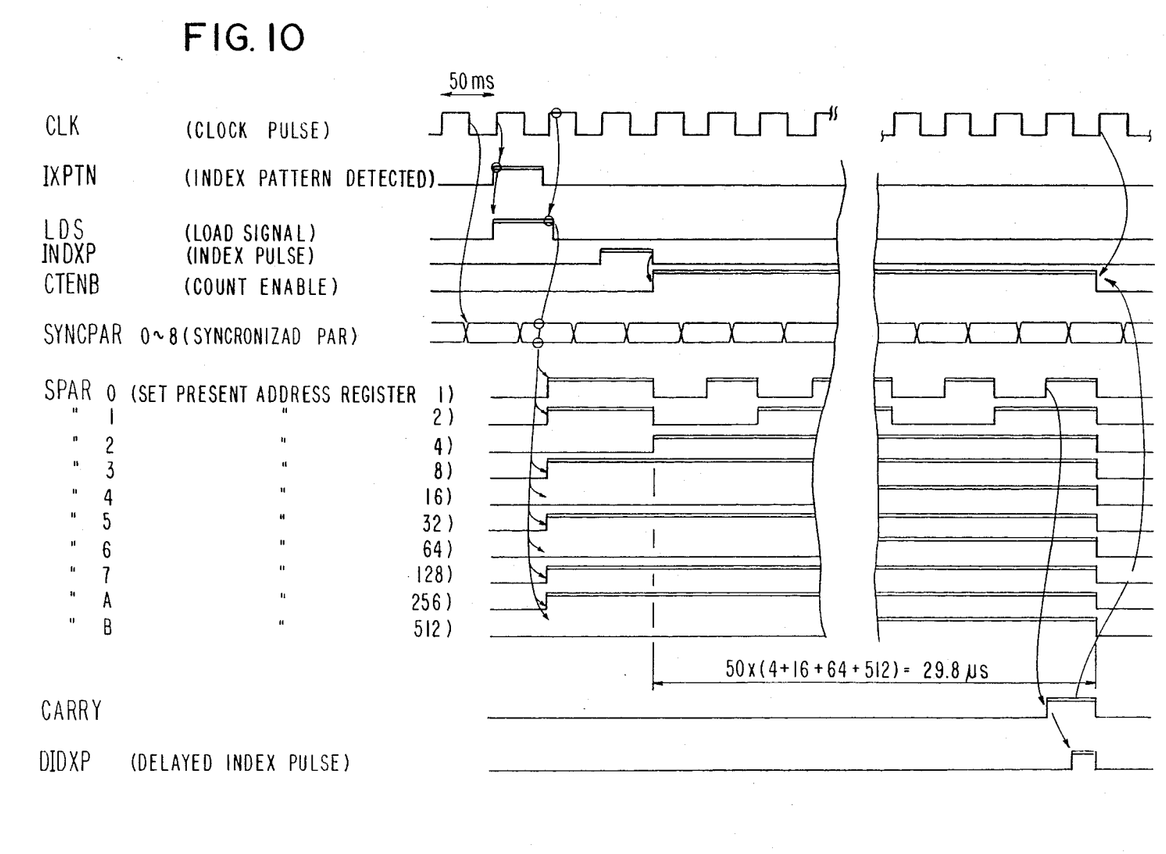
FIG. 10 is a timing chart of signal present in the circuit of FIG. 8 and 9.

In this example, the cylinder addresses are denoted with numerals 1 through n, which increase sequentially from the most outer cylinder to the most inner cylinder respectively as shown in FIG. 4. A servo pulse SVP for the disk rotation servo is output from the servo demodulator 51 and input to an index pattern detector 56, which recognizes the pattern of the index mark from the servo pulse SVP, and then outputs a single pulse which is an index pattern detected pulse IXPTN. This pulse IXPTN is input to a loading signal generator circuit 52 as well as to an index pulse generator circuit 50. Then, the loading signal generator circuit 52 generator a loading signal LDS, and the index pulse generator circuit 50 generates an index pulse INDXP, delayed by, for example, two clock cycle after the loading signal LDS. Both the leading signal LDS and the index pulse INDXP have a pulse width of, for example, a single clock cycle, as shown in FIG. 10. The index pulse INDXP is use for the synchronous rotation servo as described below, and also may be supplied to other circuits not related to this invention. In some of the waveforms in FIG. 10, the peak value is illustrated by a double parallel line.

Figure 9:
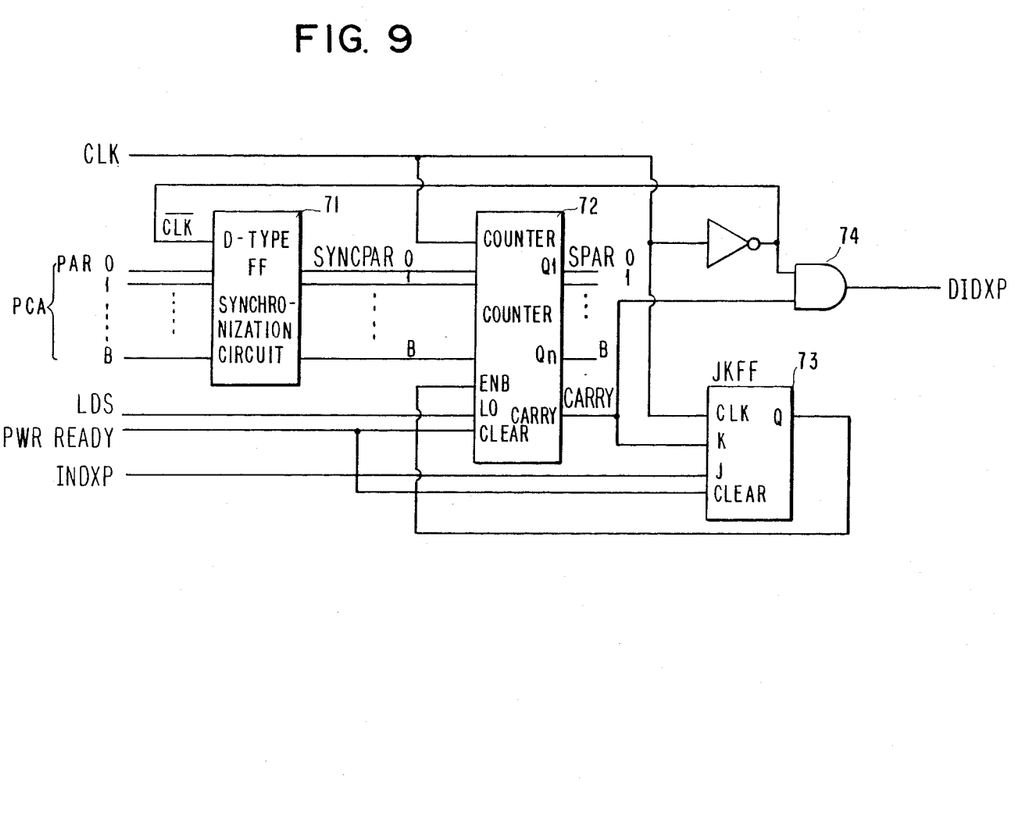
FIG. 9 is a detailed block diagram of the delay circuit of the present invention.

Details of the delay circuit 7 are shown in FIG. 9. A synchronization circuit 71 in the delay circuit 7 is a latch circuit including D-type flip-flops. Synchronization circuit 71 receives a present cylinder address PCA, which includes parallel signals PAR0 through PARB, from the servo control logic circuit 54, and outputs the signals PCA as "synchronized PAR, SYNCPAR 0~B" in parallel and synchronization with an inverted clock pulse $\overline{CLK}$. Initiated by the rising edge of the IXPTN pulse, a loading signal generator circuit 52 generates a loading signal LDS having a predetermined period, which in this example is chosen to be a period of a single cycle (or more) of the clock pulse CLK, as shown in FIG. 10. The falling edge of the loading signal LDS initiates loading of the above-mentioned SYNCPAR signals into the counter 72. Thus, the counter 72 is loaded with the present cylinder address PCA on which the head is located. A count-enable signal ENB initiated by the index pulse INDXP (the mechanism of which is explained below) causes the counter 72 to begin counting clock pulses CLK input thereto, adding to the previously loaded PCA number, and outputs a carry signal CARRY when the counted number reaches a predetermined value. A preset circuit 73, comprising a flip-flop, is synchronized with a clock pulse CLK by the index pulse INDXP from the index pulse forming circuit 50, and is reset by the carry signal CARRY and outputs the count-enable signal ENB to the counter 72. An AND gate 74 outputs the logical product of the carry signal CARRY and the inverted clock pulse $\overline{CLK}$, and outputs the delayed index signal DIDXP.

Figure 11:
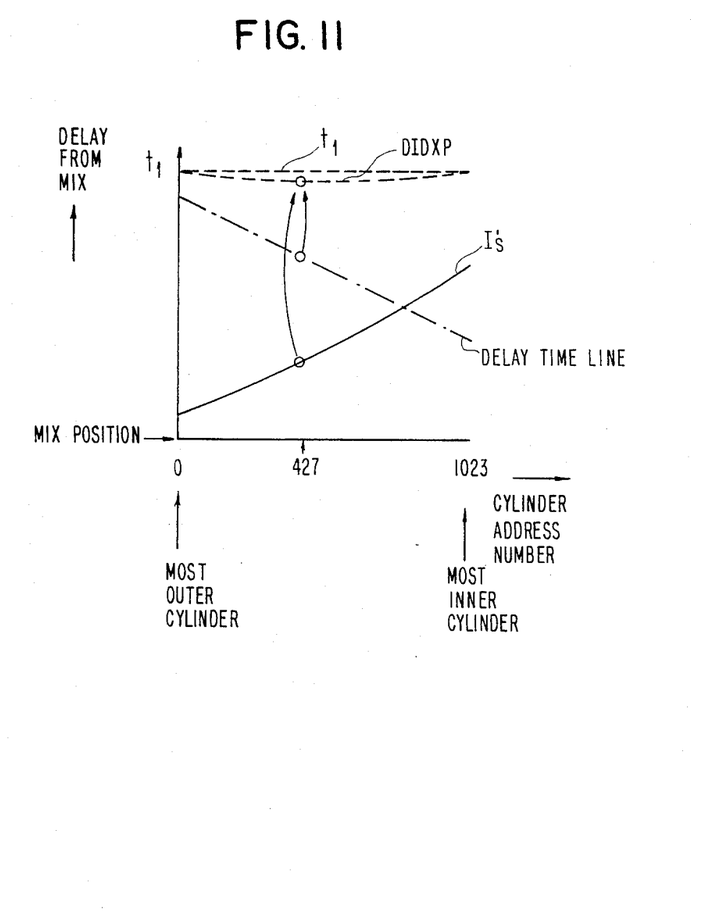
FIG. 11 is a graph showing the phase relation of the index marks or delayed index marks versus the cylinder address number.

The general operation of the embodiment of the invention is as follows. For this example, assume that the total number of cylinders and the capacity of the counter 72 are both 1024, and that the head is located on a particular cylinder whose number is "0110101011"=1+2+8+32+128+256=427. This address information is stored in the servo control logic circuit 54 and is used to search for the cylinder corresponding to this address. The cycle time of the clock pulse is properly chosen as described below. The index mark of this cylinder is read by the servo head 3a, demodulated by the servo demodulator 51, recognized/detected by the index detector 56 and input into both the loading signal generator circuit 52 and the index pulse generating circuit 50. Then the loading signal generating circuit 52 causes the counter 72 to be loaded with the present cylinder address information SPAR 0~B having the above-mentioned address 1+2+8+32+128+256 (see FIG. 10) from the servo control circuit 54 via the synchronization circuit 71. After being delayed by two clock cycles, the falling edge of the index pulse INDXP enables the counter to count the clock pulses and add them to the already loaded address number. When the counted number reaches the predetermined number (which is the counter capacity in this example), the counter 72 outputs a carry signal CARRY, which is output as a delayed index pulse DIDXP gated by the inverted clock pulse is the AND gate 74. The preset circuit 73 discontinue the count-enable signal upon receipt of the carry signal CARRY, and accordingly, the counter discontinues its output signal CARRY. The delay time cause by the delay circuit 72 in this example is 40 ns×(4+16+64+512)=20.5 μs, where 4+16+64+512=596 indicates the complement of the present cylinder address for the total cylinder number 1024 (0 to 1023) of this case. The delay time of the delay circuit 72 is in a linear relation to the cylinder address number as shown by the delay time line of FIG. 11. Dashed line DIDXP in FIG. 11 represents the delayed index DIDXP. The DIDXP line is a sum of the line IS' and the delay time line. Due to the rotation of the head arm, the IS' line is not a straight line. The DIDXP line is an approximately straight line, and is close to the line representing time $t_1$ (which was referred to in FIG. 7). This is because the cycle time 40 ends of the clock pulse CLK was chosen so that the delay time line in FIG. 11 is essentially the complement of the line IS', and thus falls on a straight line $t_1$ having an essentially constant delay from the mechanical index MIX. In other words, the cycle time may be chosen as an integral multiple of a deviation of the index mark IS' from that of the adjacent cylinder. Alternatively, the cycle time may be approximately determined by, for example, the total sum of each deviation of the index marks IS' from each adjacent cylinder, divided by the total number of cylinders—1. Thus, the dotted line DIDXP has an essentially constant phase delay after the mechanical index MIX.

The delayed index pulse is input to the phase comparator 60 illustrated in FIG. 8, which compares the delayed index pulse DIDXP with the rotation synchronous pulse RSP from the external controller for synchronous operation of a number of disk apparatus and outputs the phase difference. The phase difference output supplied a current according to the phase difference to charge a capacitor installed in the charge pump 61, thus producing a voltage across the capacitor. The output voltage of the charge pump 61 is phase-compensated by the phase compensation circuit which includes the amplifer 62a, the differentiator circuit 62b and the adder circuit 62c. The rotation of the spindle motor 2 is controlled via the power amplifier 63 according to a conventional technique. Thus, the spindle motor 2 is controlled to have the same phase as that of the delayed index signal DIDXP, i.e., it is locked therewith, regardless of the cylinder on which the head is located.

According to the present invention, the above-described phase difference, approximately 40μs, between the most inner and the most outer cylinders of the prior art is reduced to almost zero. Thus, the rotation of the disk delays are essentially constant phase after the mechanical index regardless of which cylinder the head is located on. Therefore, even when a plurality of the disk apparatus are required to be synchronized, all the disks can be locked to the external synchronization pulse.

Though in the above-described embodiment of the invention the delay circuit delays the index pull INDXP for each cylinder, this delay operation may be carried out for every several cylinders as a group, such as four cylinders. In other words, the index pulses INDXP of, for example, four adjacent cylinders are grouped to be delayed by a common delay time. In this case, the cycle period of the clock pulse CL is chosen to be 160 ns. The accuracy required in keeping the constant phase at which the delayed index pulses DIDXP are generated is worse than that of the above-described embodiment, however, the accuracy is still high enough for practical use, and it is advantageous in that the circuit configuration can be simpler and less expensive. Although the number of cylinders in this group is four, this number is largely dependent on the value of the azimuth, and accordingly on the deviation of adjacent two cylinders, because the amount of the azimuth has a direct effect on the amount of the allowable phase change when searching for a cylinder.

In the above-described embodiment of the invention the delay circuit 7 is a digital counter generating a delay time which is in a linear relation to the cylinder number on which the head is located, the delay circuit may also be a different circuit. For example, to compensate for the non-linear location of the index mark IS1 through ISn' with respect to the cylinder number, as shown by the arc IS' in FIG. 11, the delay times $t_2$ through $t_n$ are programmed for each cylinder to generate constantly delayed pulse regardless of the cylinder on which the head is located. The delay time for each cylinder may be stored in a solid state memory, for example, a look-up table. Or, as another example, the delay circuit 7 may be an analog circuit.

In the above-described embodiment of the invention of the disk surfaces and one of the magnetic heads are used exclusively for servo control of the disk rotation and tracking, however, this invention is also applicable to a disk configuration in which the exclusive servo surface of the disk and its servo head are not provided but are part of a data track used to carry the servo information.

In the above-described embodiment of the invention the read/write head is moved by an arm mechanism for the searching operation, however, the present invention may also be applied to a system in which the head is moved by a mechanism of linear motion, when an azimuth exists.

The many features and advantages of the invention are apparent from the detailed specification are thus, it is intended by the appended claims to cover all such features and advantages of the system which fall within the true spirit and scope of the invention. Further, since numerous modifications and changes will readily occur to those skilled is the art, it is not desired to limit the invention to the exact construction and operation shown and described, and accordingly, all suitable modification and equivalents may be resorted to, falling within the scope of the invention.

What is claimed is:

1. An apparatus for synchronous control of a magnetic recording disk having cylinders, each cylinder having a cylinder number represented as a cylinder address and an index mark, said apparatus comprising:
    read means for reading the index marks from the cylinders and gererating index pulses in response thereto; and
    delay means for delaying each of the index pulses by a delay amount to output delayed index pulses at a predetermined time, the delay amount varying in dependence upon the cylinder number corresponding thereto, said delay means delays in accordance with a curve representing the delay amount of the index pulses with respect to the cylinder address, the curve is essentially the complement of a curve representing the misalignment of the index marks with respect to the cylinder address.

2. An apparatus for reading and writing information onto magnetic recording disks using read/write heads, comprising:
    information storage means for storing information, said information storage means including a plurality of rotatable disks having cylinders, one of the disks having index marks on each of its cylinders, one of the disks having a reference mark indicating a reference position of rotation of the disks;
    position means for moving the read/write heads over the cylinders; and
    control means for synchronizing rotation of the disks by reading the index marks and the reference mark, outputting index mark signals, for each of the index marks, and outputting a reference mark signal for the reference mark, said control means including delay means for selectively delaying the index mark signals and outputting delayed index mark signals, the delayed index mark signals are output offset from the reference mark by a constant time with respect to the reference mark signal.

3. An apparatus as recited in claim 5, wherein said position means comprises an arm moveable in a plane parallel to the surface of the disks and pivotable on an axis perpendicular to the surface of the disks, said arm having a first end at which said read/write head is mounted and a second end from which said arm is pivotable.

4. An apparatus as recited n claim 2, wherein said delay means includes a digital counter for of counting clock pulses input thereto, the clock pulses to be counted being a count number determined based on the cylinder on which the read/write head is located, said delay means outputting one of the delayed index mark pulses when the counter finishes counting the count number of clock pulses.

5. An apparatus as recited in claim 3, wherein said delay means includes a digital counter for counting clock pulses input thereto, the clock pulses to be counted being a count number determined based on the cylinder on which the read/write head is located, said delay means outputting one of the delayed index mark pulses when the counter finishes counting the count number of clock pulses.

6. An apparatus as recited in claim 4, wherein the cylinders have cylinder addresses, and the cylinder addresses increase numerically from the most inner cylinder to the most outer cylinder of each of the disks.

7. An apparatus as recited in claim 4, wherein the cylinders have cylinder addresses, and the cylinder addresses decrease numerically from the most inner cylinder to the most outer cylinder of each of the disks.

8. An apparatus as recited in claim 6, wherein the count number for each of the cylinders is based upon the cylinder addresses.

9. An apparatus as recited in claim 6, wherein the count number for each cylinder is stored in dependence on the cylinder addresses, the count number being predetermined so that the delayed index pulses are generated at an essentially constant position with respect to the reference mark.

10. An apparatus as recited in claim 9, wherein the count number for each cylinder is predetermined for a group of adjacent cylinders.

11. An apparatus as recited n claim 9, wherein a cycle time of the clock pulses is chosen as an integral multiple of a difference of delay times between the index marks of two adjacent cylinders.

12. An apparatus as recited in claim 10, wherein a cycle time of the clock pulses is chosen as an integral multiple of a difference of delay times between the index marks of the group of adjacent cylinders.

13. An apparatus as recited in claim 9, wherein a cycle time of the clock pulses is chosen as an integral multiple of the total sum of each deviation of the index marks from each adjacent cylinder divided by the total number of the cylinders minus 1.

14. An apparatus as recited in claim 7, wherein the count number for each cylinder is stored in dependence on the cylinder addresses, the count number being predetermined so that the delayed index pulse for each cylinder is generated at an essentially constant position with respect to the reference mark.

15. An apparatus for synchronous control of a magnetic recording disk having cylinders, each cylinder having a cylinder number within the magnetic recording disk and an index mark, said apparatus comprising:
read means for reading the index marks from the cylinders and generating index pulses in response thereto; and
delay means for delaying each of the index pulses by a delay amount to output delayed index pulses at a predetermined time, the delay amount varying in dependence upon the cylinder number corresponding thereto, said delay means comprising
a synchronization circuit;
a counter operatively connected to said synchronization circuit;
a preset circuit operatively connected to said synchronization circuit and said read means; and
an AND gate having a first input operatively connected to said synchronization circuit and a second input operatively connected to said counter and said preset circuit.

16. An apparatus for synchronous control of a magnetic recording disk having cylinders, each cylinder having a cylinder number within the magnetic recording disk and an index mark, said apparatus comprising:
read means for reading the index marks from the cylinders and generating index pulses in response thereto; and
delay means for delaying each of the index pulses by a delay amount to output delayed index pulses at a predetermined time, the delay amount has a linear relationship with respect to the cylinder number corresponding thereto.

17. An apparatus as recited in claim 16, wherein the magnetic recording disk further includes a total cylinder number, the cylinder number has a binary address representation, and the delay amount for each of the cylinders is the one's complement of the binary address representation for the total cylinder number.

18. An apparatus as recited in claim 2, wherein the delay amount has a linear relationship with respect to the cylinder number corresponding thereto.

19. An apparatus as recited in claim 2, wherein said apparatus receives a rotation synchronization pulse,
wherein said apparatus further comprises rotation means for rotating the plurality of rotatable disks, and
wherein said control means is further for detecting a phase difference between the rotation synchronization pulse and the delayed index mark signals and for controlling said rotation means based on the phase difference to synchronize the rotation synchronization pulse and the delayed index mark signals.

20. An apparatus for receiving a rotation synchronization pulse and for reading and writing information onto recording disks using read/write heads, said apparatus comprising:
information storage means for storing information, said information storage means including a plurality of rotatable disks having cylinders, one of the rotatable disks having a reference mark and index marks on each of the cylinders corresponding thereto;
position means for moving the read/write heads over the cylinders;
index mark signal outputting means for reading the index marks and outputting an index mark signal corresponding to each of the index marks;
delay means for selectively delaying the index mark signals to produce a delayed index mark signal, the delayed index mark signals are delayed according to a predetermined schedule in dependence upon each of the cylinders so as to be offset by a constant time with respect to the reference mark; and
control means for controlling the rotation of the rotatable disks to synchronize the rotation of the rotatable disks with the rotation synchronization pulse based on the delayed index mark signals.

21. An apparatus as recited in claim 20, wherein the recording disks are magnetic recording disks.

* * * * *